United States Patent [19]

Wieserman et al.

[11] Patent Number: 4,983,566
[45] Date of Patent: * Jan. 8, 1991

[54] SURFACE-MODIFIED ADSORBENT COMPRISING METAL OXIDE/HYDROXIDE PARTICLES REACTED WITH ONE OR MORE PERFLUORINATED ORGANIC ACIDS

[75] Inventors: Larry F. Wieserman; Karl Wefers, both of Apollo; Kathryn Cross, Murrysville; Edward S. Martin, New Kensington, all of Pa.

[73] Assignee: Aluminum Company of America, Pittsburgh, Pa.

[*] Notice: The portion of the term of this patent subsequent to Nov. 29, 2005 has been disclaimed.

[21] Appl. No.: 265,131

[22] Filed: Oct. 31, 1988

Related U.S. Application Data

[63] Continuation-in-part of Ser. No. 23,423, Mar. 9, 1987, Pat. No. 4,788,176, which is a continuation-in-part of Ser. No. 946,870, Dec. 29, 1986, abandoned.

[51] Int. Cl.$^5$ .................. B01J 20/22; B01J 20/32; B01D 15/08; B32B 9/00
[52] U.S. Cl. ..................... 502/401; 55/67; 210/198.2; 210/198.3; 210/502.1; 210/635; 427/220; 435/176; 502/4; 502/407; 502/415; 530/811; 530/812
[58] Field of Search ............ 502/401, 407, 415, 150, 502/158, 162, 7; 210/198.2, 198.3, 656; 55/67, 197, 386; 427/220

[56] References Cited

U.S. PATENT DOCUMENTS

| | | | |
|---|---|---|---|
| 3,013,904 | 12/1961 | Cupery | 117/76 |
| 4,202,798 | 5/1980 | Johnson et al. | 252/437 |
| 4,308,079 | 12/1981 | Venables et al. | 148/6.15 R |
| 4,382,016 | 5/1983 | Rickelton et al. | 252/428 |
| 4,506,628 | 3/1985 | Stockel | 119/1 |
| 4,547,474 | 10/1985 | Olah | 502/168 |
| 4,737,478 | 4/1988 | Rainis | 502/439 |
| 4,741,830 | 5/1988 | Hauck et al. | 502/401 |
| 4,778,600 | 10/1988 | Williams | 210/198.2 |
| 4,786,628 | 11/1988 | Wieserman et al. | 502/401 |
| 4,788,176 | 11/1988 | Wieserman et al. | 502/401 |

*Primary Examiner*—Paul E. Konopka
*Attorney, Agent, or Firm*—Andrew Alexander

[57] ABSTRACT

An active material and method of making same are disclosed comprising a metal oxide/hydroxide surface having chemically bonded to reactive sites thereon, a layer of a perfluorinated organic material formed by reacting with the metal oxide/hydroxide a perfluorinated organic acid comprised of an acid group and a perfluorinated carbon-containing group. The bond to the metal oxide/hydroxide surface is formed by reaction of the acid group with the metal oxide/hydroxide surface, so that the perfluorinated carbon-containing group is oriented away from the metal oxide/hydroxide surface. The perfluorinated organic acid may be a perfluorinated phosphonic acid, a perfluorinated phosphinic acid, a perfluorinated carboxylic acid, or a mixture of two or more of the acids.

19 Claims, 2 Drawing Sheets

SURFACE-MODIFIED ADSORBENT COMPRISING METAL OXIDE/HYDROXIDE PARTICLES REACTED WITH ONE OR MORE PERFLUORINATED ORGANIC ACIDS

CROSS REFERENCE TO RELATED APPLICATIONS

This application is a continuation-in-part of U.S. Ser. No. 023,423, filed March 9, 1987, now U.S. Pat. No. 4,788,176, which is a continuation-in-part of U.S. Ser. No. 946,870, filed Dec. 29, 1986 (now abandoned), and is related to U.S. Ser. No. 023,312, filed March 9, 1987, now U.S. Pat. No. 4,871,711, and U.S. Ser. No. 023,429, filed March 9, 1987, now U.S. Pat. No. 4,786,628.

BACKGROUND OF THE INVENTION

1. Field of the Invention

This invention relates to the product of the reaction of metal oxide/hydroxide particles with a perfluorinated organic acid to form an active material useful as an adsorbent.

2. Description of the Related Art

Analytical and industrial adsorbents made from organic resins suffer from poor physical strength, poor thermal stability, high cost, solvent swelling, and low capacity. Adsorbents made from metal oxides such as silica exhibit poor chemical stability at high pH. For many applications, in particular for high pressure and large separation columns, an adsorbent with high physical integrity, good chemical stability over high and low pH conditions, specific surface functionalities, good thermal stability, and low cost is needed for a wide range of applications.

Other metal oxides such as alumina have also been used as adsorbents because of the good physical integrity and low cost of alumina. The solubility of alumina in pH ranges between 4 and 9 is very low and the material is, therefore, chemically and physically stable in this pH range. However, beyond this pH range, on either the basic or acidic side, alumina becomes soluble in aqueous media and its physical strength and integrity degrades rapidly.

Modifications of metal oxide adsorbents such as alumina and aluminosilicates have been proposed. Stockel U.S. Pat. No. 4,506,628 teaches the formation of an adsorbent animal litter utilizing alumina, aluminosilicates, or coal residues as the substrate intimately mixed with monomers containing acid functionalities which polymerize in situ. The monomer, such as vinyl phosphonic acid, together with a redox catalyst, is mixed with a pliable dough formed from alumina and water and extruded into pellets which harden as the monomer polymerizes.

Modified alumina has also been used in the formation of catalysts. Johnson et al U.S. Pat. Nos. 4,202,798 and 4,251,350 describe the formation of a hydrocarbon hydrotreating catalyst formed by contacting alumina with a phosphorous-containing acid compound such as phenylphosphonic acid and then calcining the phosphorous-containing hydrous alumina. The calcined alumina is then treated with at least one metal-containing compound and again calcined to form the catalyst product.

In addition, Cupery U.S. Pat. No. 3,013,904 discloses a substrate having an organic polymer containing pentavalent phosphorous bonded thereto. Coatings of phosphorous-containing organic polymers are applied over coatings of positively charged colloidal metal oxides applied to negatively charged substrates. the thickness of the combined colloidal oxide and polymer layers on a substrate is less than 100 millimicrons.

Venables et al U.S. Pat. No. 4,308,079 teaches the treatment of an aluminum oxide surface of a aluminum substrate with a monomolecular layer of an amino phosphonate compound such as nitrilotris (methylene) triphosphonic acid to retard hydration of the aluminum oxide to aluminum hydroxide to provide a more stable microporous surface which is particularly suited to commercial adhesives. The presence of the hydrated oxide is said to interfere with the formation of a satisfactory bond between the adhesive and the oxide, while the phosphonate treatment is said to inhibit the conversion of the oxide to hydroxide without interfering with subsequent bonding of the adhesive to the oxide.

In our parent applications Ser. Nos. 946,870 and 023,423, cross-reference to which are hereby made, there is disclosed and claimed an active material capable of functioning as an adsorbent which comprises a metal oxide/hydroxide particle having chemically bonded to reactive sites on the surface thereof a monomolecular layer of one or more types of phosphorous-containing organic molecules. The organic molecule is comprised of a phosphorous-containing group capable of forming a chemical bond with the reactive sites on the metal oxide/hydroxide particle and a carbon-containing group or site oriented away from the surface of the metal oxide/hydroxide particle and capable of functioning as the active component or site of the molecule.

While this material serves as an improved adsorbent with greater chemical stability and other improved properties, including improved regeneration properties since the adsorbed material can be desorbed more readily from the organically modified surface than if the adsorbed were bonded to the underlying hydroxyl groups, it has been found that in some instance the bond between the material being adsorbed and the hydrogen ions on the organic material is still too strong to permit good desorption. For example, the recovery value of certain peptides and proteins adsorbed on the active material of the aforesaid patent applications may be as low as 4–15 wt. % of the total amount adsorbed.

It would, therefore, be desirable to provide a modified surface on the adsorbent which would be still be capable of adsorbing materials such as proteins, peptides, etc., but which not form as strong a bond to the adsorbed material.

SUMMARY OF THE INVENTION

An active material is provided comprising a metal oxide/hydroxide particle having chemically bonded to reactive sites on the surface thereof a layer of a perfluorinated organic material.

It is, therefore, an object of this invention to provide an active material suitable for use as an adsorbent comprising a metal oxide/hydroxide particle having chemically bonded to reactive sites on the surface thereof a layer of a perfluorinated organic material comprising an acid group bonded to the metal oxide/hydroxide surface and a perfluorinated carbon-containing group oriented away from the metal oxide/hydroxide surface.

It is another object of this invention to provide an active material suitable for use as an adsorbent stable at extended pH ranges and insoluble in aqueous media ranges comprising a layer of perfluorinated organic molecules bonded to the surface of a metal oxide/hydroxide particle.

It is yet another object of this invention to provide an active material suitable for use as an adsorbent comprising a monomolecular layer of perfluorinated organic molecules chemically bonded to the surface of a metal oxide/hydroxide particle.

It is a further object of this invention to provide an active material suitable for use as an adsorbent comprising a monomolecular layer of perfluorinated organic material chemically bonded to the surface of a metal oxide/hydroxide particle by reacting a perfluorinated organic acid with a reactive siteson the surface of the metal oxide/hydroxide particle.

It is yet a further object of this invention to provide a process for making such an active material suitable for use as an adsorbent which comprises chemically bonding to the surface of a metal oxide/hydroxide particle a layer of one or more types of perfluorinated organic molecules.

These and other objects of this invention will be obvious from the following description and accompanying drawings.

DETAILED DESCRIPTION OF THE INVENTION

In accordance with the invention, the active material comprises a metal oxide/hydroxide particle having chemically bonded thereto a layer of a perfluorinated organic material wherein the organic molecule is comprised of an acid group bonded to a reactive site on the surface of the metal oxide/hydroxide and a perfluorinated carbon-containing group oriented away from the surface of the metal oxide/hydroxide particle and capable of functioning as the active component of the molecule. Preferably, a monomolecular layer of the perfluorinated organic material is formed on the surface by reacting the acid group of the perfluorinated organic molecule with the surface of the metal oxide/hydroxide particle.

The active material of the invention is suitable for use as an adsorbent which is stable over a large pH range, i.e., from 1-14, and which, unlike at least some of the metal oxide/ hydroxides useful as the support material, is insoluble in aqueous media. The active material of the invention is particularly useful as an adsorbent for peptides and proteins, where strong bonding between the adsorbent and the material being adsorbed is not desirable, as well as for other uses such as, for example, as an adsorbent or coupling agent for biological materials such as enzymes, whole cells, yeasts, proteins, microbes, pharmaceuticals including timed-release drugs, and vaccines.

Figure 1:
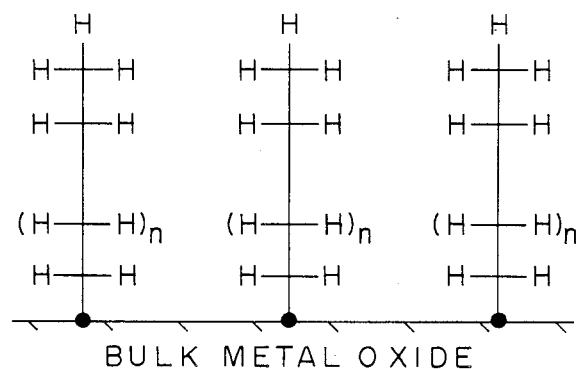
FIG. 1 is an illustration of a metal oxide/hydroxide surface modified in accordance with the teaching of the parent applications.
Figure 2:
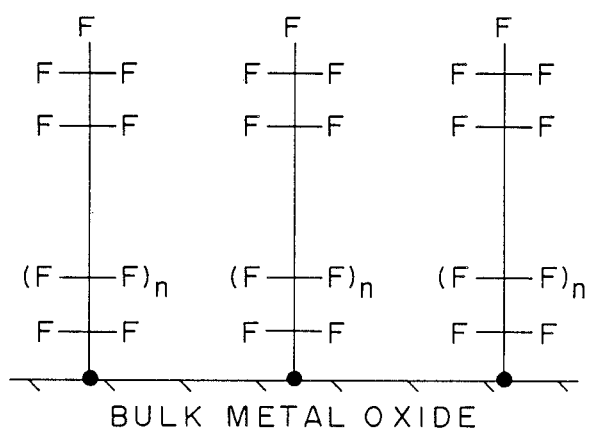
FIG. 2 is an illustration of a metal oxide/hydroxide surface modified in accordance with the invention.
Figure 3:
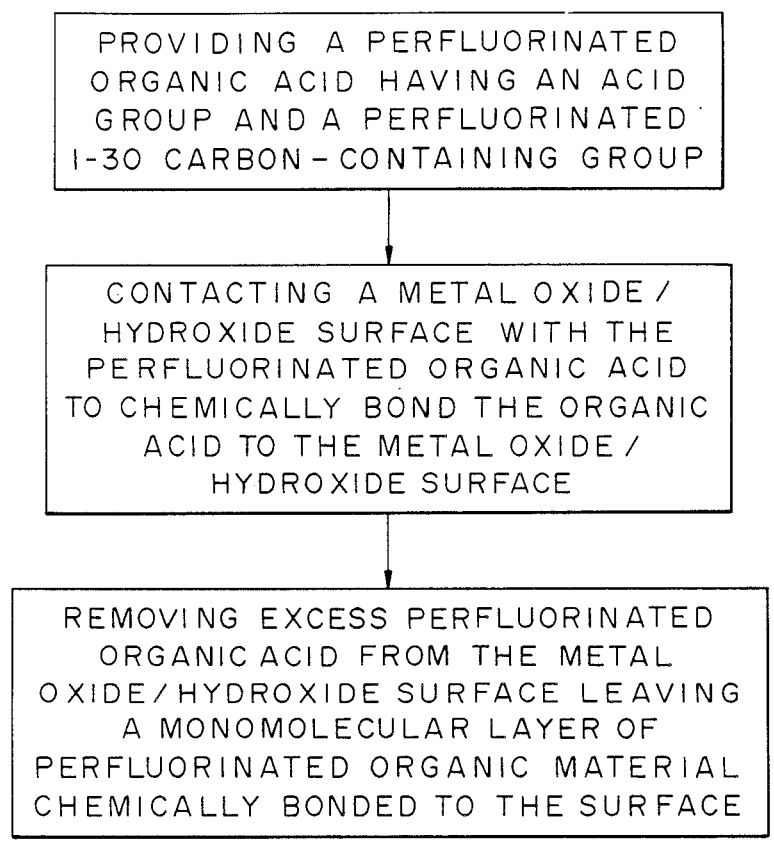
FIG. 3 is a flowsheet illustrating the invention.

Referring to FIGS. 1 and 2, in FIG. 1, a metal oxide/hydroxide surface is shown which has been modified by the formation thereon of a monomolecular layer of an organic material in accordance with the invention described and claimed in the aforesaid parent applications Ser. Nos. 946,870 and 023,423. It can be seen that each of the carbon atoms in the organic material, which represents the simplest form of the organic material described and claimed in our parent application, has bonded thereto hydrogen atoms. Adsorption then takes place by interaction or affiliation which is thought to be due to the van der Waals forces between the hydrogen atoms and the material adsorbed thereon, as opposed to ionic, covalent or hydrogen bonding interactions.

While this van der Waals attraction is not as strong as the bond to the hydroxyl group of an untreated metal oxide/ hydroxide surface, it is sufficiently strong that some biological materials such as proteins, peptides, etc. are not easily desorbed therefrom. In contrast, in accordance with the invention, the protons in the organic material chemically bonded to the metal oxide/hydroxide surface have been replaced by fluorine atoms which form a weaker attraction or affiliation with the protein or peptide molecule which attraction or affiliation, while sufficient to permit adsorption of such molecules, will permit subsequent desorption of higher amounts of the adsorbed material since covalently bound fluorine surfaces should have the lowest van der Waals forces and attraction of all with any type of molecule and therefore the weakest adsorption interaction.

The use of the term "active material" is intended to define a 1-30 carbon perfluorinated organic molecule, preferably an aliphatic molecule, having a acid group thereon, preferably at the end of the molecule, capable of bonding to the metal oxide/ hydroxide support and having an organic group with substantially all of the hydrogen atoms bonded to the carbon atoms thereon preferably replaced by fluorine atoms. By the expressions or terms "substantially all of the hydrogen atoms replaced by fluorine atoms" or "perfluorinated" is meant that at least 90%, preferably 99%, and most preferably 99.9% or more of the hydrogen atoms bonded to carbon atoms in the organic material have been replaced by fluorine atoms. In another embodiment, up to about 20% of the halogen atoms replacing the hydrogen atoms may be chlorine and/or bromine atoms with the balance comprising fluorine atoms. However, the use of substantially all fluorine atoms is preferred due to the weaker interactions between the fluorinated surfaces and the materials being adsorbed, lower chemically reactivity of the fluorinated surfaces, and low toxicity compared with other halogenated surfaces.

The layer of perfluorinated organic material is formed on the surface of the metal oxide/hydroxide surface by reacting the surface with a perfluorinated organic acid. Such a perfluorinated organic acid may comprise a perfluorinated phosphonic acid, a perfluorinated phosphinic acid, a perfluorinated carboxylic acid, or a mixture of two or more of the foregoing acids. The formula for the perfluorinated phosphonic acid useful in the practice of the invention may be written as $RPO(OH)_2$, the perfluorinated phosphinic acid may be written as $RR'PO(OH)$, and the perfluorinated carboxylic acid may be written as $RCO(OH)$, where both R and R' may each be comprised of 1-30, preferably 5-30, perfluorinated carbon-containing organic moieties such as an alkyl group. When R and/or R' comprise a perfluorinated straight chain aliphatic carbon-containing organic moiety, in accordance with the preferred embodiment of the invention, R may be expressed as $C_nF_{2n+1}$- and R' may be expressed as $C_mF_{2m+1}$- where n=1-30 and m≦n.

Such perfluorinated organic acids are commercially available; for example, perfluorinated carboxylic acids from either Alpha Products, Division of Morton Thiokol, Inc., or perfluorinated phosphonic acids from Hoechst-Celanese Corporation. Alternatively perfluorinated organic acids may be formed by fluorinating the corresponding unfluorinated organic acid by reacting the corresponding organic acid, for example, with low concentrations of fluorine in a noble gas such as helium or argon; by slow electrolysis of a fluorine-containing salt in a non-aqueous solvent; or by fluorination with $SbF_5$.

Generally, perfluorinated aliphatic straight chain monocarboxylic acids having the formula $C_nF_{2n+1}PO(OH)_2$, where n=1–30, are preferred. However, the use of other perfluorinated such as perfluorinated branched chain aliphatic monocarboxylic acids, perfluorinated dicarboxylic acids having the formula $HOOC(CF_2)$ COOH wherein n=1–12, perfluorinated hetero-aliphatic acids, perfluorinated aromatic acids and diacids, perfluorinated dimer acids, perfluorinated carbocyclic and heterocylic acids, and perfluorinated anhydrides are also within the scope of the invention.

Examples of the preferred perfluorinated aliphatic organic acids which may be useful in forming the active material of the invention include: perfluorinated ethanoic acid, perfluorinated propanoic acid, perfluorinated butanoic acid, perfluorinated pentanoic acid, perfluorinated hexanoic acid, perfluorinated octanoic acid, perfluorinated decanoic acid, perfluorinated dodecanoic acid, perfluorinated tetradecanoic acid, perfluorinated hexadecanoic acid, perfluorinated octadecanoic acid, perfluorinated methyl phosphonic acid, perfluorinated ethyl phosphonic acid, perfluorinated propyl phosphonic acid, perfluorinated butyl phosphonic acid, perfluorinated pentyl phosphonic acid, perfluorinated hexyl phosphonic acid, perfluorinated octyl phosphonic acid, perfluorinated decyl phosphonic acid, perfluorinated dodecyl phosphonic acid, perfluorinated tetradecyl phosphonic acid, perfluorinated hexadecyl phosphonic acid, perfluorinated octadecyl phosphonic acid, perfluorinated dimethyl phosphinic acid, perfluorinated methyl ethyl phosphinic acid, perfluorinated diethyl phosphinic acid, perfluorinated methylpropyl phosphonic acid, perfluorinated ethylpropyl phosphinic acid, perfluorinated dipropyl phosphinic acid, perfluorinated methylbutyl phosphinic acid, perfluorinated methylpentyl phosphinic acid, perfluorinated methylhexyl phosphinic acid, perfluorinated methyloctyl phosphinic acid, perfluorinated methyldecyl phosphinic acid, perfluorinated methyldodecyl phosphinic acid, perfluorinated methyltetradecyl phosphinic acid, perfluorinated methylhexadecyl phosphinic acid, and perfluorinated methyloctadecyl phosphinic acid.

The use of the term "metal oxide/hydroxides" herein is intended to define a broad spectrum of oxides ranging from those which may contain few hydroxides, e.g., activated forms of aluminum oxide (alumina) to more hydrated forms which may comprise mainly hydroxide, e.g., $Al(OH)_3$. It has been found, however, that the metal hydroxide form, rather than the metal oxide form, provides a better bond with the perfluorinated organic acid molecule with which it is reacted. However, for certain applications, dehydrated or activated forms of the metal oxide/hydroxide may be preferred due to the higher surface area of such particles. For example, when aluminum oxide/hydroxide is used, the hydrated form will be preferred, e.g., gibbsite, bayerite, or boehmite will be preferred when a large external surface area is desired and activated alumina will be preferred when it is desirous that the metal oxide/hydroxide have a high internal surface area.

As presently understood, the metal oxide/hydroxides suitable for use in the present invention require hydroxyl groups or other suitable reaction sites on the surface thereof for purposes of providing bonding sites for the perfluorinated organic materials. For example, when the particulate material is alumina, hydroxyl groups on the surface of the alumina react with the acid group of the organic molecule, i.e., with the —POOH acid group of the perfluorinated phosphonic or perfluorinated phosphinic acid or the —COOH acid group of the perfluorinated carboxylic acid. When using an organic solvent, particularly where the solvent is immiscible with water, a monolayer of hydroxyl groups are provided on the alumina particles for purposes of reacting to form a chemical bond with the acid groups. It will be appreciated that if more than a monolayer of hydroxyl units are present on the alumina surface, such as hydroxyl units present as a result of water, this additional water layer can act to hinder the reaction. Thus, while it is preferred to have a maximum of a monolayer of hydroxyl units, less than a complete surface layer of hydroxyl units can be present on the metal oxide and such does not hinder reactivity.

Metal oxide/hydroxides which may be used as the support particle for reaction with the perfluorinated organic acid include any metal capable of forming a metal oxide/hydroxide and reacting with the perfluorinated organic acid selected from the class consisting of Groups IIIa (Sc and Y), IVa (Ti, Zr, and Hf), Va (V, Nb, and Ta), VIa (Cr, Mo, and W), VIIa (Mn, Tc, and Re), VIII (Fe, Ru, Os, Co, Rh, Ir, Ni, Pd, and Pt), Ib (Cu, Ag, and Au), IIb (Zn, Cd, and Hg), IIIb (B, Al, Ga, In, and Tl), IVb (Ge, Sn, and Pb), Vb (As, Sb, and Bi), elements in the lanthanide series and the actinide series, mixtures thereof, and mixtures of Groups IIa (Be, Mg, Ca, Sr, Ba, and Ra) and VIb (Se, Te, and Po) and combinations thereof. Particularly preferred metal oxide/hydroxides are the oxide/hydroxides of Al, Ti, Zr, and Fe.

For example, the oxide/hydroxides of aluminum, magnesium, titanium, zirconium, iron, chromium, zinc, vanadium, and combinations of these may be used. Also, a core or center of iron oxide/hydroxide or other paramagnetic or ferromagnetic material may be used with a coating of a metal compound to take advantage of the magnetic properties of of the iron oxide/ hydroxide as an adsorbent. It should be noted that by use of the term "metal", it is intended to include not only the traditional metals, but also materials sometimes referred to as metalloids such as Se, B, As and Te and to exclude the remaining elements referred to as nonmetals in the periodic table.

While the invention is primarily directed to the use of metal oxide/hydroxide particles as support materials for reaction with the fluorinated organic acids to form the active material, it is within the purview of this invention that other metal compounds could be used in substitution for the metal oxide/ hydroxides such as metal silicates, oxalates, phosphates, sulfates, carbonates, apatites, hydrotalcites, zeolites, kaolin, clays and chromates as well as combinations of such materials or combinations of any of such materials with the preferred metal oxide/hydroxide support materials. Also metal oxide/hydroxides such as aluminum oxide/hydroxides with surfaces ion-exchanged or adsorbed with titanium, iron, or zirconium ions or oxides may be used.

With respect to the metal oxide/hydroxides used in the present invention, it is preferred that they are provided in particulate form for certain applications. When the use is adsorbents, particle sizes can range from as low as 50 Angstroms to provide large external surfaces and up to 12 millimeter for large reactors. When the adsorbent base is alumina the particle size can be 1 to 200 microns. It will be appreciated that other uses, for example, flocculation, flame retardant in polymers, heterogeneous catalyst, can require different particle sizes. However, normally for adsorbent use, the particle size is greater than 1 micron. Typical particle size distributions, when the metal oxide/hydroxide particles comprises aluminum oxide/hydroxide (alumina), are 1, 3–6, 7–12, 10–18, 18–32, 32–63, and 50–200 microns.

With respect to particle size morphology of the metal oxide/hydroxides used in the invention, e.g., metal oxide/ hydroxides such as alumina, or iron oxide, for purposes of the present invention, it is preferred that they have a pore size of 20 Angstroms to 10 microns in diameter. Further, it is preferred that the particles have a pore volume of 0.01 to 4 ml/g, as determined by nitrogen BET isotherms. With respect to purity, the level of impurity should be minimized depending on the end use. However, for adsorbents, for example, the metal oxide or metal compound should have a purity level of over 80%, preferably 95% or greater. Surface area of the particle is preferred to be high with typical surface areas for alumina, for example, being in the range of 0.10 to 600 m$^2$/g and up to 1000 m$^2$/g for other metal oxide/hydroxides.

To produce the active material comprising the metal oxide/hydroxide reacted with one or more perfluorinated organic acid molecules, the metal oxide/hydroxide, such as alumina, may be reacted with a perfluorinated phosphonic, phosphinic, or carboxylic acid in an suitable media, including an aqueous or non aqueous solution, emulsion, or suspension, at a temperature of from above the freezing point up to the boiling point of the solution, preferably from about 10° C. up to about 90° C., typically about 50° C., for a period of from at least 1 second to not more than 20 hours, and preferably from at least about 0.5 hours up to about 4 hours, using an initial acid concentration of at least about 0.0001 to 0.1 molar. In some instances higher concentrations may be desired. The pressure used may range from subatmospheric (1 torr) up to 10 atmospheres. Preferably the reaction is carried out at atmospheric pressure, when possible, for economic reasons. When the media is non-aqueous, the temperature range can be greatly extended. For example, it may range from 5° C. or lower to 200° C. or sometimes higher depending on the solvent.

The reaction is normally carried out at atmospheric pressure. However, the use of an elevated pressure or a subatmospheric pressure should be deemed to be within the scope of the invention. A flowing bed reactor or an aerosol may also be utilized in the treatment of the metal oxide/hydroxide particles with the phosphorus-containing material.

While we do not wish to be bound by any particular theory of bonding, it is believed that when a metal oxide/ hydroxide particle, for example, alumina, is brought into contact with the perfluorinated phosphonic, phosphinic acid, or carboxylic acid, a reaction or adsorption of the acid on the alumina takes place in which the aluminum and phosphorus or carbon atoms in the respective molecules are apparently bonded together through an oxygen atom as illustrated in the formulas below:

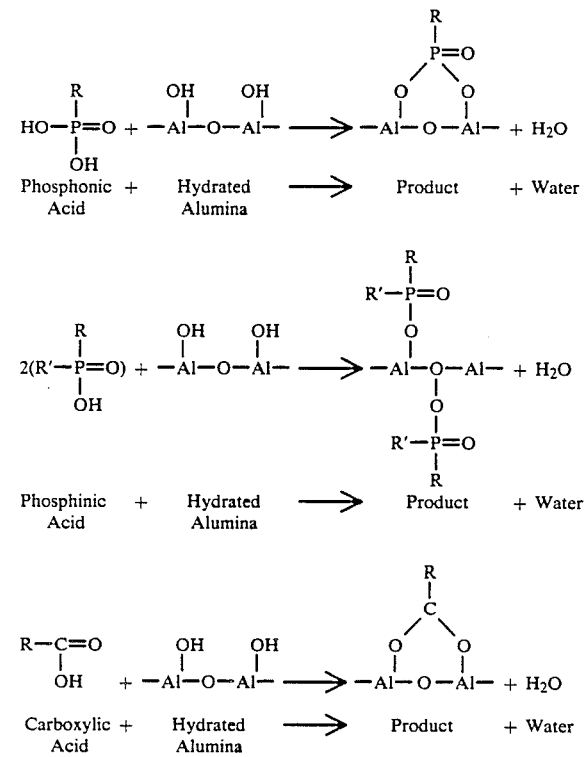

Note: Aluminum ions may be an octrahedrally or tetrahedrally coordinated cation with or without coordination vacancies at or near the surface (external or within pore structures).

Thus it can be seen, using the above proposed model, that if all of the exposed hydroxyl groups on the surface of the metal oxide/hydroxide, e.g., alumina can be reacted with the organic acid groups, the surface chemistry of the reacted alumina will be changed.

By "monolayer" or "monomolecular layer" is meant that 90%, and preferably 98%, of the perfluorinated organic acid molecules are bonded to the metal oxide/hydroxide particle as a single layer of molecules having a thickness of about 2 to about 5000 Angstroms and preferably about 3 to about 500 Angstroms. Thus, the application should be controlled so as to prevent the R or R' groups from bonding to each other to form weakly adsorbed multilayers which would then provide further hydroxyl units, i.e., —POOH or —COOH units directed away from and not bonded to the surface of the metal oxide/hydroxide particles, thereby defeating the purpose of the invention, for example, when it is used for an adsorbent.

In general, it has been found, for example, with alumina, that if the amount of acid present, as a function of particle surface area, is maintained at about 4 to 6 micromoles/ square meter, preferably about 4.5 to 5.5 micromoles/square meter, and most preferably about 5 micromoles/square meter, that a monomolecular layer will be formed on the particle surface. Generally, an acid concentration of from about 0.1 to 10 micromoles/ square meter, preferably about 2 to 6 micromoles/ meter, is used. Higher concentrations may be used, but will necessitate further washing, as will be described below.

In accordance with the preferred embodiment of the invention, to ensure formation of only a monomolecular layer of the perfluorinated organic acid molecules on the surface of the metal oxide/hydroxide, the treated surface is then washed with any solvent which is capable of removing excess organic acid molecules which are bound to other organic acid molecules, i.e., are not chemically bound to the surfaces of the metal oxide/hydroxide and which will not attack the organic acid molecules already chemically bonded to the metal oxide/hydroxide surfaces. In a preferred embodiment, a sodium hydroxide solution, having a concentration ranging from about 0.001 to 1 molar and buffered with sufficient sodium bicarbonate to maintain the pH in a range of from about 9 to 12, may be used as the wash solution to remove the excess organic acid molecules, leaving only the desired bonded monomolecular layer.

Other wash solutions which may be used instead of the sodium hydroxide include potassium hydroxide and ammonium hydroxide solutions which may also be buffered to provide approximately the same pH range. Weak acids including organic acids such as acetic acid, formic acid or other carboxylic acids or weak mineral acids (0.1–2 N) such as sulfuric, nitric, or hydrochloric acids may also be used. Halocarbon liquids such as the freons (fluorocarbons and/or chlorofluorocarbons) or fluorocarbon ethers may also be used as wash compounds. However, the use of bases as wash solutions are preferred since the resulting salts, e.g., sodium or potassium salts, are more soluble.

In the present invention, particularly when the end use is an adsorbent, it is preferred that the organic moiety on the perfluorinated organic acid be at least a five-carbon chain. The chain can have 20 to 30 or more carbons, as noted earlier. The longer chains preferably are used in the initial bonding or loading of the metal oxide particle with the perfluorinated organic acid. However, because of the pores and fissures that can be present on the metal oxide particle, particularly those having high surface area, often all the surface hydroxyl units are not reacted because of the inability of the longer chain perfluorinated organic acid to reach or diffuse into the pores and fissures. Thus, to inert or block remaining reactive sites, short-chain perfluorinated organic acids, e.g., less than 6 carbon molecules per chain, can be used. In this way, all of the reactive sites are capped or blocked. That is, for capping off the reactive sites, short-chain perfluorinated organic acids can be used. For example, an alumina treated with a high molecular weight perfluorinated phosphonic, phosphinic, or carboxylic acid, e.g. a perfluorinated n-heptadecylphosphonic acid, may be further treated with a low molecular weight perfluorinated phosphonic acid, e.g., perfluorinated methylphosphonic acid, to treat any remaining unreacted alumina surface areas.

In the present invention, the weight of the layer of perfluorinated organic molecules can range from about 0.01 to 75 wt. % calculated on the total weight of the coated metal oxide, and preferably the monomolecular layer can range from about 4 to 50 wt. %, typically 5 to 20 wt. %. For purposes of ensuring that a monomolecular layer of perfluorinated organic material is bonded to the metal oxide/hydroxide particles, the application should be carefully controlled. That is, a monomolecular layer can be obtained, for example, by controlling the viscosity of the aqueous medium of solution, the time of exposure in the solution, the concentration of perfluorinated organic material in the solution, or the concentration of hydroxyl units on the metal oxide/hydroxide particles, in addition to the post washing step described above.

The following examples will serve to further illustrate the practice of the invention.

EXAMPLE I

A material consisting of 50 grams of high surface area (100 meter$^2$/gram) calcined alumina was added to a reactant mixture containing 200 ml of water and 5 grams of perfluorinated octanoic acid. The mixture was heated to 50° C. and held at this temperature for 2 hours with continuous stirring. The mixture was filtered to separate the surface modified metal oxide/ hydroxide from the liquid. The solid was washed for 1 hour with 200 ml of water to remove excess reactant weakly adsorbed. The wash mixture was filtered and the solid dried at 60° C. for 1 hour. The resultant surface modified alumina product recovered was found to be suitable for use as a bulk adsorbent or as packing in a chromatographic column.

EXAMPLE II

The material produced in Example I may be further reacted with 2.5 grams of perfluorinated acetic acid, a short chain perfluorinated organic acid, to increase the surface hydrophobicity of the surface. The same procedure may be followed as described above in Example I.

EXAMPLE III

The same procedure may be followed as in Example I except that a perfluorinated alkylphosphonic acid such as Product 5.18, Fluowet PP, by Hoechst may be used.

Having thus described the invention, what is claimed is:

1. An active material comprising a metal oxide/hydroxide particle material reacted with a perfluorinated organic acid to bond a substantially monomolecular layer thereof to a surface of said oxide/hydroxide, said organic acid selected from the class consisting of perfluorinated phosphonic acid having the formula $RPO(OH)_2$, and perfluorinated phosphinic acid having the formula $RR'PO(OH)$, perfluorinated carboxylic acid having the formula $RCOOH$, and mixtures thereof, where R comprises a perfluorinated carbon-containing group and R' comprises a perfluorinated carbon-containing group, each perfluorinated carbon-containing group of said perfluorinated organic acid being oriented away from said metal oxide/hydroxide surface said element selected from the class consisting of Sc, Y, Ti, Zr, Hf, V, Nb, Ta, Cr, W, Mn, Tc, Re, Fe, Ru, Co, Rh, Ir, Ni, Pd, Pt, Cu, Ag, Au, Zn, Cd, Hg, B, Al, Ga, In, Tl, Ge, Sn, Pb, As, Sb and Bi, elements in the lanthanide series and the actinide series, mixtures thereof, and mixtures of Be, Mg, Ca, Sr, Ba, Ra, Se, Te and Po.

2. The active material of claim 1 wherein said metal oxide/hydroxide comprises an oxide/hydroxide of a metal selected from the class consisting of aluminum, magnesium, titanium, zirconium, iron, chromium, zinc, vanadium, and combinations of these metals.

3. The active material of claim 1 wherein said metal oxide/hydroxide is selected from the class consisting of alumina, iron oxide, zeolitic materials, zirconia, zinc oxide, magnesia, apatites, hydrotalcites, and mixtures thereof.

4. The active material of claim 1 wherein said metal oxide/hydroxide comprises alumina.

5. The active material of claim 1 wherein said alumina has a particle size in the range of 50 Angstroms to 12 millimeters.

6. The active material of claim 1 wherein the thickness of said monomolecular layer of perfluorinated organic material chemically bonded to said metal oxide/hydroxide particles is in the range of 2 to 5,000 Angstroms.

7. The active material of claim 6 wherein the thickness of said monomolecular layer of perfluorinated organic material chemically bonded to said metal oxide/hydroxide particles is in the range of 3 to 500 Angstroms.

8. The active material of claim 1 wherein said R group of said perfluorinated organic molecule contains at least 5 carbon atoms.

9. The active material of claim 1 wherein said perfluorinated organic acid comprises a perfluorinated phosphonic acid having the formula $RPO(OH)_2$ where R comprises a perfluorinated 1–30 carbon-containing aliphatic group.

10. The active material of claim 1 wherein said perfluorinated organic acid comprises perfluorinated phosphinic acid having the formula $RR'PO(OH)$ where R and R' each comprises a perfluorinated 1–30 carbon-containing aliphatic group.

11. The active material of claim 1 wherein said perfluorinated organic acid comprises perfluorinated carboxylic acid having the formula $RCOOH$ where R comprises a perfluorinated 1–30 carbon-containing aliphatic group.

12. An active material of claim 1 comprising a metal oxide/ hydroxide particle having a surface and having chemically bonded to reactive sites thereon a substantially monomolecular layer of a mixture of about 80 to 99 wt. % of said perfluorinated organic acids and the balance perhalogenated organic acids selected from the class consisting of perchlorinated and perbrominated organic acids and mixtures, said bond being formed by reaction of the acid group of said perfluorinated and perhalogenated organic acids with said metal oxide/hydroxide surface, whereby the perfluorinated or perhalogenated carbon-containing group of said organic acids are oriented away from said metal oxide/hydroxide surface.

13. A process for bonding a layer of perfluorinated organic material to a metal oxide/ hydroxide particle having a surface, the bonding to the surface to form an active material having good chemical stability over a pH range of from 1 to 14 which comprises:
   (a) providing a liquid containing a perfluorinated organic acid therein selected from the class consisting of:
      (i) perfluorinated phosphonic acid having the formula $RPO(OH)_2$;
      (ii) perfluorinated phosphonic acid having the formula $RR'PO(OH)$;
      (iii) perfluorinated carboxylic acid having the formula $RCOOH$; and
      (iv) mixtures thereof; where R comprises a perfluorinated 1–30 carbon-containing group and R' comprises a perfluorinated 1–30 carbon-containing group; and
   (b) contacting said metal oxide/hydroxide surface with said liquid to bond said perfluorinated organic acid material to at least 90% of the reactive sites on said metal oxide/hydroxide surface to form a substantially monomolecular layer of said perfluorinated organic material thereon forming said active material.

14. The process of claim 13 wherein said step of providing a liquid containing said perfluorinated organic acid therein having further comprises maintaining a concentration of said perfluorinated organic acid in said liquid of at least about 0.0001 molar.

15. The process of claim 13 wherein said step of contacting said metal oxide/hydroxide surface with said liquid containing said perfluorinated organic acid further comprises maintaining said contact for from about 1 second to about 20 hours.

16. The process of claim 15 wherein said step of contacting said metal oxide/hydroxide surface with said liquid containing said perfluorinated organic acid further comprises maintaining said contact for from about 0.5 to about 4 hours.

17. The process of claim 13 wherein said step of contacting said metal oxide/hydroxide surface with said liquid containing said perfluorinated organic acid further comprises maintaining the temperature of the reactants at from above the freezing point up to the boiling point of the solution during said contacting step.

18. The process of claim 13 including the further step of washing said active material after said contacting step to remove excess perfluorinated organic acid thereon not chemically bonded to said metal oxide/hydroxide surface to ensure formation of a monomolecular layer of said perfluorinated organic material on said metal oxide/hydroxide surface.

19. A process for chemically bonding a substantially monomolecular layer of perfluorinated organic material to a metal oxide/hydroxide particle to form an active material having good chemical stability over a pH range of from 1 to 14 which comprises:
 (a) providing a liquid containing a perfluorinated organic acid therein selected from the class consisting of:
  (i) perfluorinated phosphinic acid having the formula $RPO(OH)_2$;
  (ii) perfluorinated phosphinic acid having the formula $RR'PO(OH)$;
  III) perfluorinated carboxylic acid having the formula RCOOH; and
  (iv) mixtures thereof; where R comprises a perfluorinated 1-30 carbon-containing group and R' comprises a perfluorinated 1-30 carbon-containing group;
 (b) maintaining said liquid containing said perfluorinated organic acid at a concentration of at least 0.0001 molar;
 (c) contacting the metal oxide/hydroxide with said liquid within a temperature range of from about 25° to 90° C. for a period of from at least 1 second to about 20 hours to chemically bond said perfluorinated organic acid to at least 90% of the reactive sites on the surface of said metal oxide/hydroxide particle to form a substantially monomolecular layer of said organic material thereon comprising said active material; and
 (d) washing said active material after said contacting step to remove excess perfluorinated organic acid thereon not chemically bonded to said metal oxide/ hydroxide surface to ensure formation of a monomolecular layer of said perfluorinated organic material on the surface of said metal oxide/hydroxide.

* * * * *

UNITED STATES PATENT AND TRADEMARK OFFICE
CERTIFICATE OF CORRECTION

PATENT NO. : 4,983,566

DATED : January 8, 1991

INVENTOR(S) : Larry F. Wieserman et al

It is certified that error appears in the above-identified patent and that said Letters Patent is hereby corrected as shown below:

Claim 1, Col. 11, line 22          Delete "said" (second occurrence) and insert --wherein the metal of the metal oxide/hydroxide material is an--.

Claim 19, Col. 13, line 11         Change "phosphinic" to --phosphonic--.

Signed and Sealed this

Twenty-first Day of July, 1992

Attest:

DOUGLAS B. COMER

*Attesting Officer*          Acting Commissioner of Patents and Trademarks